United States Patent

[11] 3,591,929

| [72] | Inventors | Zdenek Zacpal<br>Horni Mostenice;<br>Petr Nemecek, Prerov, both of,<br>Czechoslovakia |
|---|---|---|
| [21] | Appl. No. | 844,335 |
| [22] | Filed | July 24, 1969 |
| [45] | Patented | July 13, 1971 |
| [73] | Assignee | Prerovske strojirny, narodni podnik<br>Prerov, Czechoslovakia |

[54] APPARATUS FOR PREHEATING PULVERIZED MATERIAL SUCH AS CEMENT RAW MATERIALS
6 Claims, 5 Drawing Figs.

[52] U.S. Cl. .................................................. 34/57 E, 263/32 R
[51] Int. Cl. ................................................... F26b 17/18, F27b 7/20

[50] Field of Search. ................................... 263/32; 34/10, 57 D, 57 E

[56] References Cited
UNITED STATES PATENTS
2,658,615  11/1953  Ebersole...................... 34/57 D
3,135,588  6/1964   Helming....................... 34/57 E

*Primary Examiner*—John J. Camby
*Attorney*—Richard Low

ABSTRACT: There is provided equipment for preheating pulverized material, such as raw cement materials, to be sintered in a kiln wherein the preheating is performed by dispersing the material by rotary means, while subjecting the same to hot gases recovered from the kiln.

INVENTORS
Zdeněk Zacpal, Petr Němeček

INVENTORS
Zdeněk Zacpal, Petr Němeček

APPARATUS FOR PREHEATING PULVERIZED MATERIAL SUCH AS CEMENT RAW MATERIALS

FIELD OF THE INVENTION

The invention relates to an apparatus for preheating of pulverized materials, more particularly cement raw materials in a dry process for the production of cement clinker.

The invention includes a preheating process preceding the burning or sintering process in rotary kilns or other heating equipment, which process is performed in a dispersion preheating unit by means of flue gases discharged from the kiln. The preheating unit is installed at the entry of the kiln.

DESCRIPTION OF THE PRIOR ART

In the past, preheaters have been subdivided into two groups according to their structure and according to the way the heat exchange is to be performed.

The preheaters of one of the groups use preheater chambers, with the heat exchange performed in a perfect or nearly perfect countercurrent manner. The other group comprises cyclone preheaters, with the heat exchange between gases and material performed successively in concurrent zones arranged countercurrently.

A common object of all types of preheaters is to separate flue gases from which heat has been recovered from the fines that have taken up the recovered heat. This will reduce the heat content in the flue gases, increase the heating efficiency of the preheating unit and also increase the economy of purifying the exit gases before they are discharged into the atmosphere.

The separation of fines from the gases is performed in cyclones located in the upper part of the preheater chamber, to which they are connected through a pneumatic line and through a line for returning the separated materials to the preheating process. The separating cyclones make the apparatus complicated and increase the building height of the whole equipment. Substantial quantities of circulated materials, causing the heat content of the discharging gases to increase, are disadvantageous and undesirable because the heat efficiency of the preheating unit decreases as a result thereof.

The separating cyclones located in the upper part of the preheater adversely affect the symmetry of the arrangement in case the preheaters are of a self-carrying structure which is undesirable. In addition to this, the exit sockets of the separating cyclones tend to form accumulations which clog the entire system with material and easily and frequently lead to a breakdown of the equipment.

The heating efficiency of the preheating unit depends on a perfect and uniform dispersion of the preheated material into the gas stream throughout the entire length of the chamber.

In the recent preheaters, the raw material has been dispersed into the gas stream in such a way that the stream of material to be preheated is leaving a conveying tube to pass onto a baffle plate or baffle cone. It is known that there exist no methods that can guarantee a perfect and uniform dispersion immediately after the material has entered the inner space of the preheater chamber. Portions of the raw material fall down through the chamber in clumps and in the course of their falling down they are imperfectly dispersed.

Every preheater has to be connected to an exhauster, which is indispensable to enable the gases to pass through the equipment. In a structure comprising a self-carrying dispersion preheater, the exhauster occupies considerable room, and this is why it is difficult to position it properly.

SUMMARY OF THE INVENTION

Accordingly, an object of the present invention is to provide a method and apparatus for overcoming the failings and disadvantages heretofore encountered.

Another object is to provide an arrangement capable of accomplishing the foregoing in a chamber of lesser height.

A further object is to provide apparatus which is capable of producing a perfect dispersion of the material to be preheated and a better separation of the material from the discharged flue gases.

Still other objects of the invention will be fully understood from the following description.

In accordance with the present invention, the foregoing objects are generally accomplished by providing apparatus which comprises a preheating chamber having means at the bottom, communicating with gas-supplying means, and conduit means for discharging preheated material, both being connected to a kiln, a tube for introducing the feed, and discharge conduit means for discharging gases at the upper end of the chamber, characterized in that in the upper zone of the preheating chambers below the tube for introducing the material there is provided a rotary separating shutter with a vertical axis of rotation.

DESCRIPTION OF PREFERRED EMBODIMENTS

Figure 1:
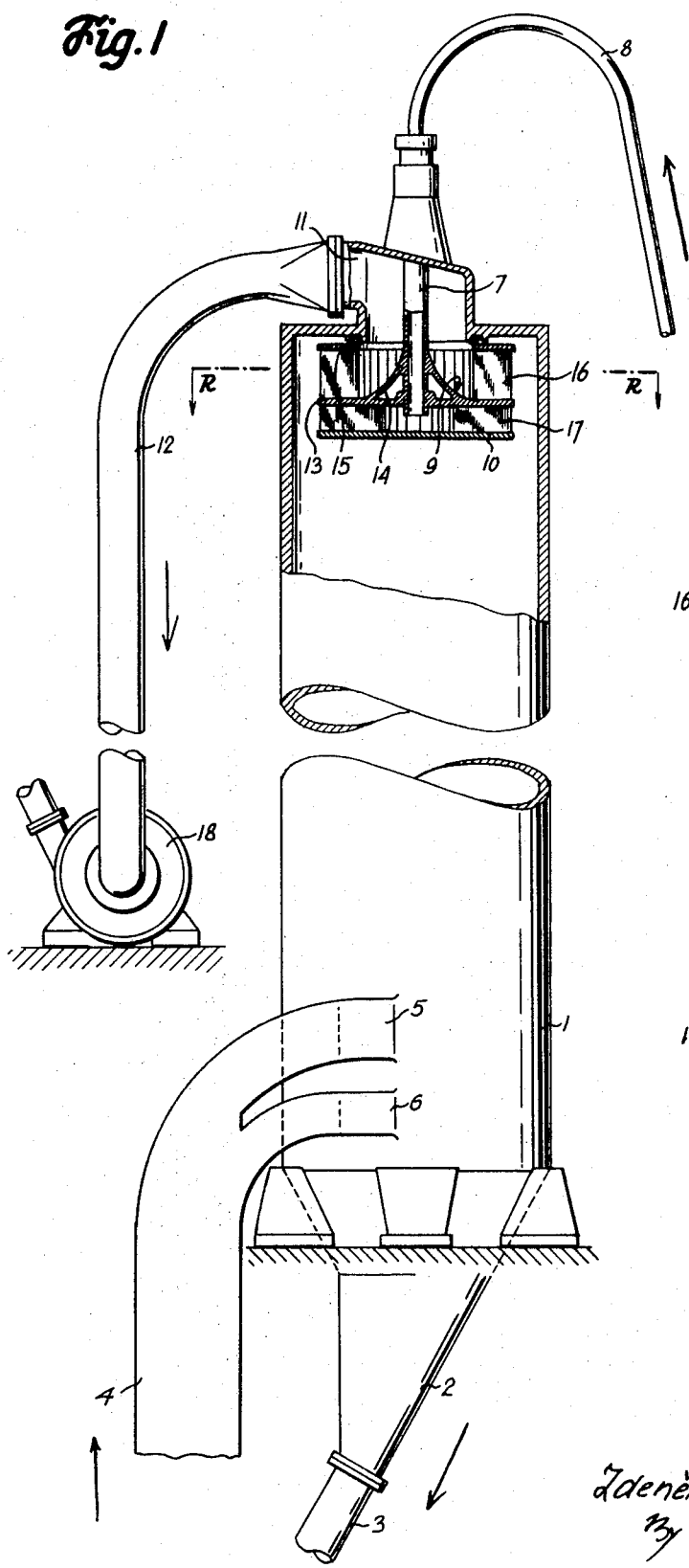
FIG. 1 is a schematic partially sectioned elevation of the equipment of the invention.

The equipment shown in FIG. 1 comprises an elongated vertical preheating chamber 1 which has a bottom part shaped as a cone-shaped discharge hopper 2 connected to a kiln (not shown) by a conduit 3.

Hot flue gases from the kiln enter tangentially the bottom part of the preheating chamber 1 through a channel 4 which opens into the preheating chamber 1 by two branches 5 and 6.

In the upper part of the preheating chamber 1 there is a rotary separating shutter 9 with a distributing plate 10 disposed on a hollow shaft 7 to which a tube 8 for introducing the pulverized material is connected.

The hollow shaft 7 is rotatably mounted in an extension piece 11 for discharging gases from the upper part of the preheating chamber 1 to a discharge conduit 12. The other end of the discharge conduit 12 is connected to the suction side of an exhaust fan 18.

Figure 2:
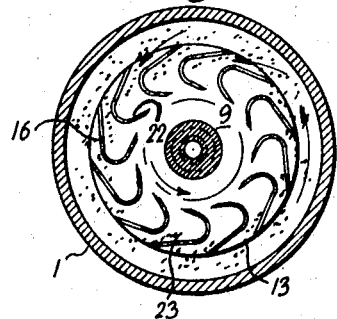
FIG. 2 is a sectional view taken in the plane of the line R-R of FIG. 1.
Figure 3:
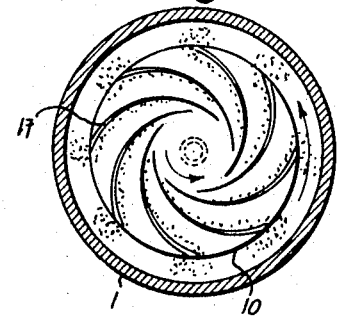
FIG. 3 is a sectional view taken in the plane of the line Q-Q of FIG. 1.

The rotary separating shutter 9 comprises an entraining disc 13 with an aerodynamic member 14 and a ring 15. Between the entraining disc 13 and the ring 15 there are disposed separating vanes 16 (see FIG. 2) deflected backwardly of the rotating direction, with their free ends 22 being bent in directions opposite to the direction of rotation of the rotary shutter 9. The flow section of channels 23 between adjacent separating vanes 16 are narrowed in the direction toward the free ends 22. The distributing plate 10 is provided with distributing vanes 17 which are deflected from the direction of rotation (FIG. 3).

In the embodiment according to FIG. 1, hot flue gases passing through the gas supply channel 4 are divided into two branches 5 and 6 and enter tangentially into the bottom part of the preheating column or chamber 1. They move on in a generally upward direction and pass into the upper part of the preheating chamber 1 between the separating vanes 16 of the rotary separating shutter 9. The gases as they pass between the separating vanes 16 change the momentum, which causes the rotary separating shutter 9 as well as the distributing plate 10 to revolve in the direction of rotation of the gases in the preheating chamber 1.

The gases continue to the extension piece 11 whence they are withdrawn through the discharge conduit 12 by means of the exhaust fan 18 whereupon they are recovered for further use. The pulverized raw material to be preheated is introduced preferably pneumatically through the tube 8 which is in fluid flow communication with the hollow shaft 7 above the distributing plate 10. The raw material is uniformly distributed on the distributing plate 10 and continuously dispersed at the circumference of the preheating chamber 1 into the stream of upwardly rotating gases. In the upper part of the preheating chamber 1 there is effected an intimate contact of the gases and the pulverized material. At the beginning, most particles of the raw material are drawn along by the gases and pass between the separating vanes 16 of the rotary separating shutter 9. Because of the rotary movement of the shutter 9 and because of the centrifugal action the raw material contained in the gases is after contacting the curved surfaces of the separating vanes 16 continually thrown to the periphery of the preheating chamber 1. The purified gases pass into the extension piece 11 and then through the exhaust 18 to be ready for further use.

As raw material is continuously fed into the preheating chamber 1, the density of the material in the gases will increase so that particles of the material will be perfectly dispersed and caused to move downwardly countercurrently with respect to the heated gases. The material passing in a downward direction against a stream of rising gases is gradually heated by absorbing the heat of the gases, and thus is preheated. Upon being preheated, the material collects in the discharge hopper 2 and is conveyed through the tube 3 into the kiln to be burned.

Figure 4:
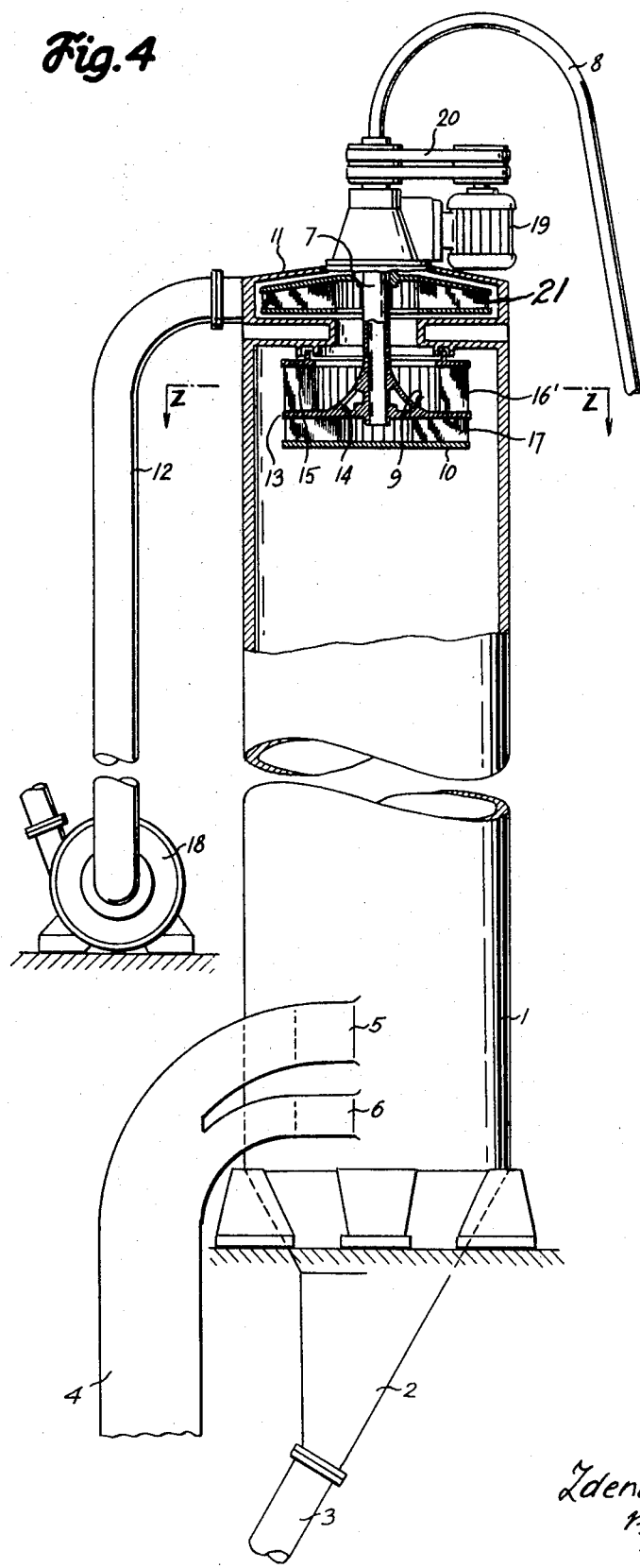
FIG. 4 is a view similar to that of FIG. 1, showing a modified form of the equipment.
Figure 5:
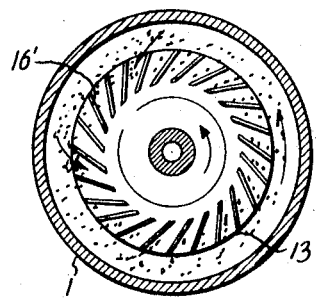
FIG. 5 is a sectional view taken in the plane of the line Z-Z of FIG. 4.

The modified form of the structure, according to FIGS. 4 and 5, comprises identical parts as the equipment according to FIG. 1, with identical parts referenced by the same numerals and modified parts bearing the same numerals with a prime. Additionally, there is an electric motor 19 connected to the hollow shaft 7 preferably by means of V-belts 20. On the hollow shaft 7 there is, also additionally, an exhaust wheel 21 besides the rotary separating shutter 9 and the distributing plate 10. The extension piece 11' is fashioned and adapted to function as a shell for the exhaust wheel 21. The separating vanes 16' are deflected backwardly with respect to the direction of rotation (FIG. 5).

In the embodiment according to FIG. 4, hot flue gases passing through the gas supply channel 4 are subdivided into two branches 5 and 6 opening into the bottom part of the preheating chamber 1. The hot gases are given a rotary movement, due to the tangential entry into the preheating chamber 1, in an ascending manner. In the upper part of the preheating chamber, the gases pass between the separating vanes 16' of the rotary separating shutter 9. The exhaust wheel 21 causes the gases to be drawn through the equipment and to be pushed into the discharge conduit 12 for further use.

The function of the equipment according to FIG. 1 differs from that of FIG. 4 in that the rotary movement of the rotary separating shutter 9 and distributing plate 10 is effected by the change of momentum of the passing gases, due to the curved shape of the separating vanes 16 of the rotary separating shutter 9, while the rotary movement of the same elements in the case of FIG. 4 is effected by an electric motor 19 through the V-belts 20.

Since the rotary movement of the rotary separating shutter 9 and distributing plate 10 in the equipment according to FIG. 4 is effected by the electric motor 19, it has been found advantageous to mount the exhaust wheel 21 for rotation with the rotary separating shutter 9.

SUMMATION

From the foregoing description it will be seen that the present invention provides an improved arrangement for preheating pulverized materials.

We claim:

1. Apparatus for preheating pulverized materials, comprising a preheating chamber having means at the bottom communicating with gas-supplying means and a conduit for discharging preheated material, both being connected to a kiln, a tube for introducing the feed, and a discharge conduit for discharging gases at the upper zone of the chamber, characterized in that in the upper zone of the preheating chamber below the tube for introducing the material there is provided a rotary separating shutter with a vertical axis of rotation, said rotary separating shutter being in its bottom part equipped with a distributing plate and a rotary entraining disc, distributing vanes, connecting said distributing plate and said rotary entraining disc, said rotary entraining disc being arranged coaxially with and superposed on said distributing plate and including a hollow rotatable shaft opening into the space between said distributing plate and said rotary entraining disc.

2. In the apparatus according to claim 1, said distributing vanes (17) extending forwardly with respect to, and being deflected from, the direction of rotation of said hollow shaft.

3. In the apparatus according to claim 1, a ring (15) being arranged coaxially with and superposed on said entraining disc (13), discharge conduit means (12), and separating vanes (16) connecting said entraining disc and said ring, said ring having an inner circumference which helps define an annular passage therethrough connecting the space between said ring and said entraining disc with said discharge conduit means (12).

4. In the apparatus according to claim 3, portions (22) at free ends of said separating vanes (16) extending in directions opposed to the direction of rotation of said rotary shutter (9), flow sections of channels (23) between adjacent separating vanes (16) being narrowed at said free end portions (22).

5. In the apparatus according to claim 3, said separating vanes (16) being deflected backwardly with respect to the direction of rotation.

6. In the apparatus according to claim 1, an exhaust wheel (21) mounted to act upon the gases to be discharged from said preheating chamber, and an electric motor (19) provided to drive said distributing plate (10), said distributing vanes (17), and said exhaust wheel (21).